No. 702,280. Patented June 10, 1902.
A. T. BROWN.
POWER TRANSMITTING MECHANISM.
(Application filed Nov. 18, 1901.)
(No Model.) 3 Sheets—Sheet 1.
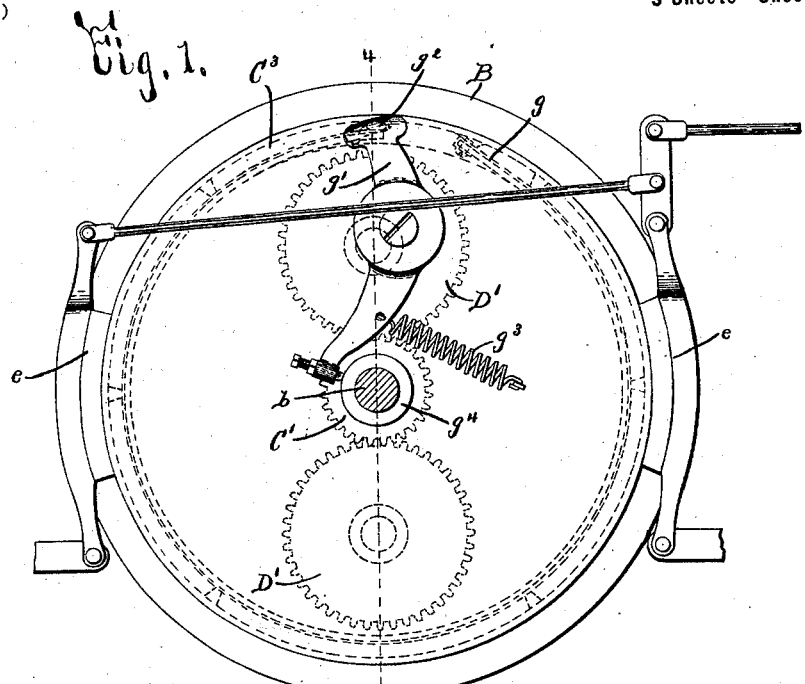
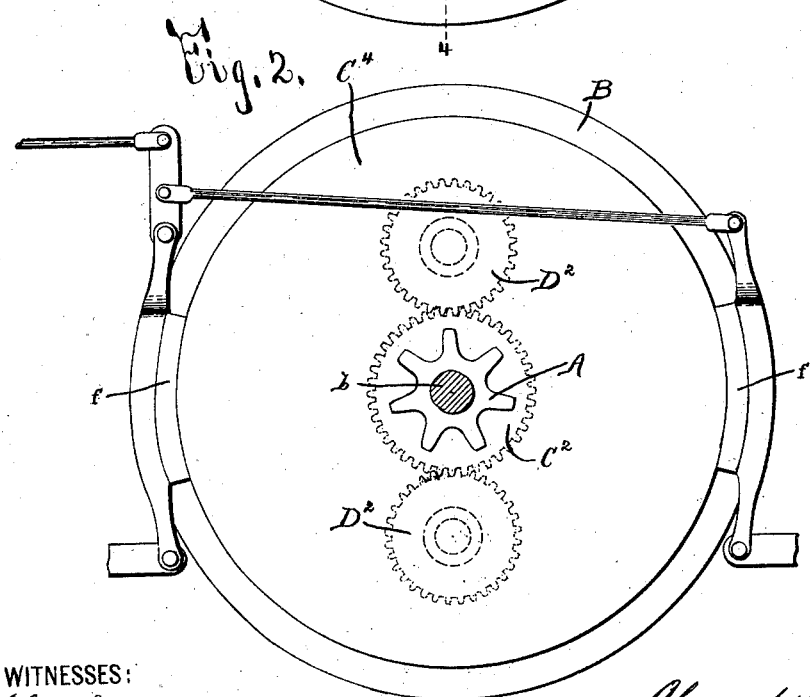
WITNESSES:
Chas. J. Joner.
Wm. T. Brewer.
INVENTOR
Alexander T. Brown.
BY
Hey & Parsons
ATTORNEYS No. 702,280. Patented June 10, 1902.
A. T. BROWN.
POWER TRANSMITTING MECHANISM.
(Application filed Nov. 18, 1901.)
(No Model.) 3 Sheets—Sheet 2.

WITNESSES:
Chas. J. Foner.
Wm. T. Brewer.

INVENTOR
Alexander T. Brown.
BY
Hey & Parsons.
ATTORNEYS

No. 702,280. Patented June 10, 1902.
A. T. BROWN.
POWER TRANSMITTING MECHANISM.
(Application filed Nov. 18, 1901.)
(No Model.) 3 Sheets—Sheet 3.

WITNESSES:
Chas. J. Foner.
Wm. T. Brewer.

INVENTOR
Alexander T. Brown.
BY
Hoyt & Parsons.
ATTORNEYS

UNITED STATES PATENT OFFICE.

ALEXANDER T. BROWN, OF SYRACUSE, NEW YORK.

POWER-TRANSMITTING MECHANISM.

SPECIFICATION forming part of Letters Patent No. 702,280, dated June 10, 1902.

Application filed November 18, 1901. Serial No. 82,630. (No model.)

*To all whom it may concern:*

Be it known that I, ALEXANDER T. BROWN, of Syracuse, in the county of Onondaga and State of New York, have invented certain new and useful Improvements in Power-Transmitting Mechanism, of which the following is a specification.

My invention has for its object the production of a power-transmitting mechanism which is especially applicable for transmitting power from the motors of automobiles to the propelling-wheels thereof, and is particularly simple in construction, economical in manufacture, and durable and efficient in use; and to this end it consists in the devices and combinations hereinafter set forth and claimed.

Figure 3:
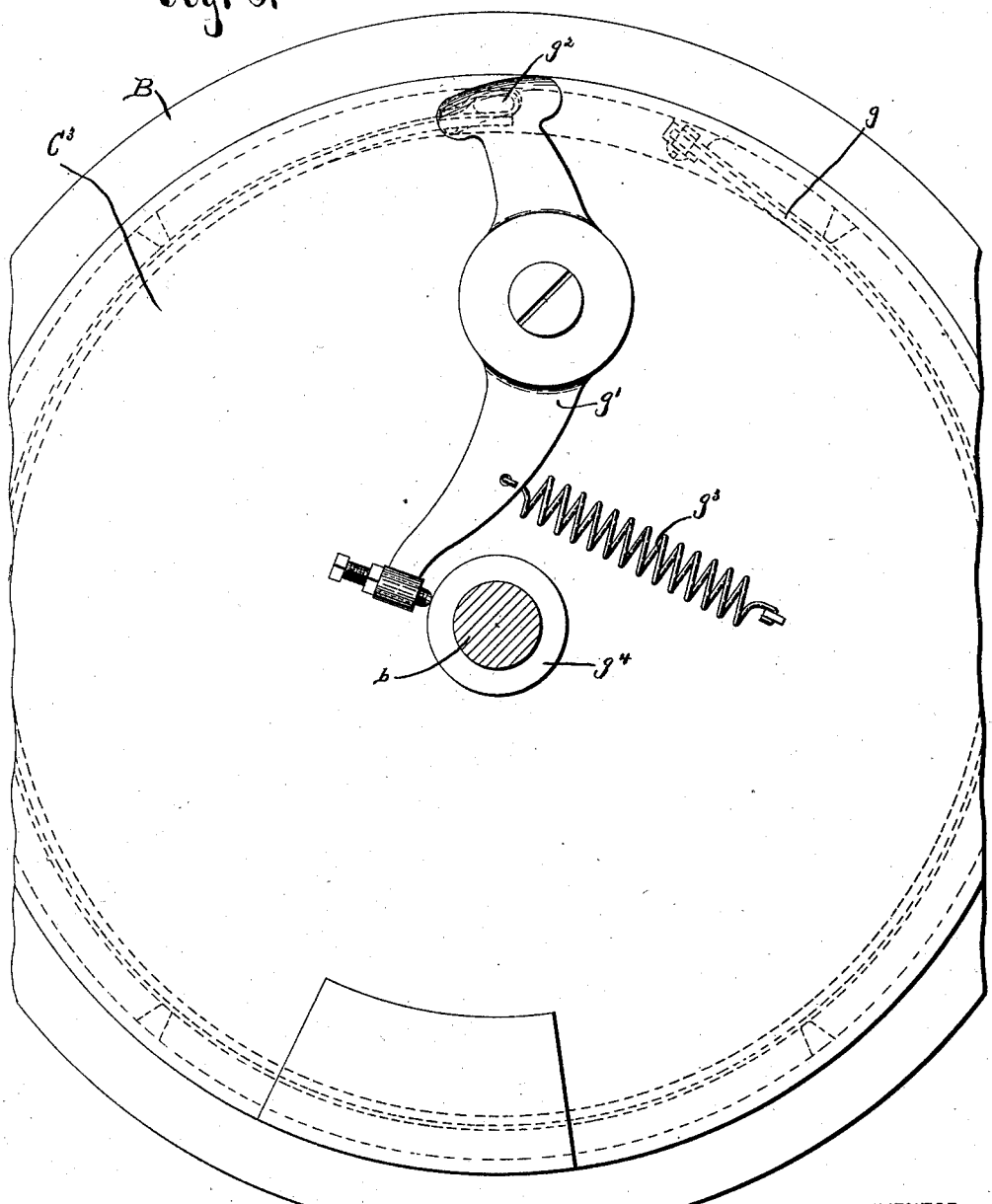
Figure 4:
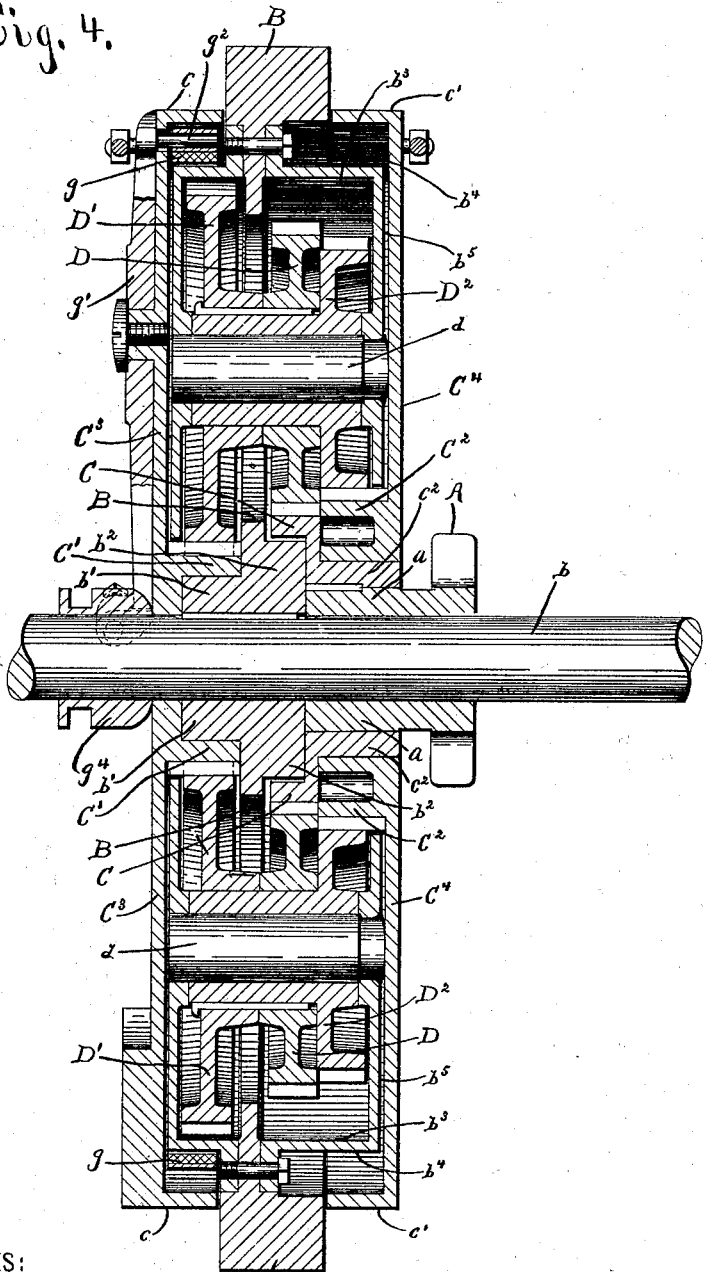

Figures 1 and 2 are opposite side elevations of the preferable embodiment of my power-transmitting mechanism. Fig. 3 is an enlarged side elevation of a portion of the parts seen in Fig. 1. Fig. 4 is a vertical sectional view taken on line 4 4, Fig. 1.

The preferable embodiment of my power-transmitting mechanism comprises, essentially, revoluble driven and driving members A B, spur-gears C C' C² D D' D², means for preventing the rotation of the gears C' C², and means for connecting the gear C' to the driving member B. The driven member A is here shown as loosely mounted on a shaft $b$, as provided with a hub $a$, and as consisting of a sprocket or gear wheel for driving the propelling-wheels of an automobile through the medium of a chain or other desirable means. Said driving member B is arranged with its axis substantially coincident with the axis of the driven member A, being here illustrated as fixed to the shaft $b$ and as composed of the fly-wheel of the engine or other motor for driving the automobile, to the propelling-wheels of which the member A is connected. The member B is usually formed with opposite hubs $b'$ $b^2$ and with an opening or chamber $b^3$, which is generally partly inclosed by peripheral and side walls $b^4$ $b^5$. The gears C C' C² are of unequal diameter and are preferably arranged with their axes substantially coincident with the axes of the driven and driving members A B. The gear C, of intermediate size, is usually constantly revoluble with the driven member A, being here
illustrated as fixed to the hub thereof, and the small and large gears C' C² are capable of rotation relatively to the driven member, being here shown as fixed, respectively, to disks C³ C⁴, loosely revoluble around the axes of the members A B and having opposing sides formed with inwardly-extending flanges encircling annular surfaces of the driving member B and provided with peripheral engaging faces $c$ $c'$. In the illustrated embodiment of my invention the gear C partly encircles one of the hubs of the driving member and is provided with a hub $c^2$, the gear C' is loosely mounted on the other hub of the driving member B and the contiguous part of the shaft $b$, and the gear C² is loosely mounted on the hub $c^2$ of the gear C. Said gears D D' D² are of unequal diameter, are fixed together, are preferably meshed with the gears C C' C², rotate as planetary gears around said gears C C' C², are generally supported by the driving member B eccentrically to its axis, and are revoluble with said driving member, being shown as arranged within the opening or chamber $b^3$ and as journaled on a spindle $d$, having its ends supported by the side walls $b^5$ $b^5$. The gears D D' D² when constructed and arranged as shown and described connect the gear C, revoluble with the driven member A, to the driving member B and to the gears C' C², capable of revolution relatively to the driven member, and transmit different rotary motions from the driving member B to the gear C, revoluble with the driven member A. I usually provide the driving member B with two sets of gears D D' D², arranged opposite to each other; but only one set may be used, if desired. The illustrated means for preventing the rotation of the gears C' C² consists of brake-shoes $e$ $e$ $f$ $f$, which respectively engage the faces $c$ $c'$ and hold the disks C³ C⁴ stationary and are actuated by any suitable means unnecessary to describe herein.
Said means for connecting the gear C' to the driving member B is here shown as consisting of a transversely-split friction-ring $g$, interposed between contiguous annular surfaces of the driving member B and the disk C³ and having one end fixed to the disk C³, a lever $g'$, having its intermediate portion pivoted to the outer face of the disk C³ and one end thereof provided with an arm $g^2$, movable in a slot in the disk $C^3$ and connected to the other end of the ring $g$, a spring $g^3$ for holding the lever $g'$ in its inoperative position, and a collar $g^4$, loosely mounted and longitudinally movable on the shaft $b$ and having one end formed substantially conical and movable toward the disk $C^3$ and engaged with the lever $g'$ for forcing the same into its operative position and having its other end provided with a groove for receiving a fork or other actuating means not necessary to illustrate.

In the operation of my power-transmitting mechanism when the brake-shoes $e\ e$ are actuated to hold the disk $C^3$ and the gear $C'$ stationary the driving member B and the gears $C'\ D'\ D\ C$ rotate the driven member A forwardly at less speed than the driving member B, and if said brake-shoes $e\ e$ remain in their inoperative position and the brake-shoes $f\ f$ are actuated to hold the disk $C^4$ and the gear $C^2$ stationary the driving member B and the gears $C^2\ D^2\ D\ C$ rotate said member A backwardly or in the reverse direction to that of the driving member B. If it is desired to connect the gear $C'$ to the driving member the brake-shoes $e\ e\ f\ f$ are allowed to remain inoperative and the collar $g^4$ is moved lengthwise of the shaft $b$ toward the disk $C^3$, thus forcing the lever $g'$ into its operative position and locking the disk $C^3$ to the driving member B, whereupon the gears $C\ C'\ C^2\ D\ D'\ D^2$ are locked together and rotate the member A forwardly with the same speed as the driving member B.

The construction and operation of my power-transmitting mechanism will now be readily understood upon reference to the foregoing description and the accompanying drawings, and it will be obvious to those skilled in the art that more or less change may be made in the construction and arrangement of its parts without departing from the spirit of my invention.

Having thus fully described my invention, what I claim as new, and desire to secure by Letters Patent, is—

1. The combination of revoluble driven and driving members, a plurality of gears of unequal diameter, one being revoluble with the driven member and the others being capable of revolution relatively to the driven member, a plurality of planetary gears of unequal diameter revoluble with the driving member and coöperating with the former gears for transmitting motion from the driving member to the driven member, and means for preventing the rotation of said gears capable of revolution relatively to the driven member, substantially as and for the purpose described.

2. The combination of revoluble driven and driving members, a plurality of gears of unequal diameter, the gear of intermediate size being revoluble with the driven member and the small and large gears being capable of revolution relatively to the driven member, a plurality of planetary gears of unequal diameter revoluble with the driving member and coöperating with the former gears for transmitting motion from the driving member to the driven member and rotating said driven member at different speed than the driving member and in reverse directions, and means for preventing the rotation of said small and large gears, substantially as and for the purpose specified.

3. The combination of revoluble driven and driving members, a pair of gears of unequal diameter, one being revoluble with the driven member and the other being capable of revolution relatively to the driven member, a pair of planetary gears of unequal diameter revoluble with the driving member and coöperating with the former gears for transmitting motion from the driving member to the driven member, and means for connecting to the driving member said gear capable of revolution relatively to the driven member and causing the same to rotate with the driving member, substantially as and for the purpose set forth.

4. The combination of revoluble driven and driving members, a pair of gears of unequal diameter, the large gear being revoluble with the driven member and the small gear being capable of revolution relatively to the driven member, a pair of planetary gears of unequal diameter revoluble with the driving member and coöperating with the former gears for rotating the driven member in the same direction as the driving member and at less speed, and means for connecting said small gear to the driving member and causing the same to rotate with the driving member, substantially as and for the purpose described.

5. The combination of revoluble driven and driving members, a pair of gears of unequal diameter, one being revoluble with the driven member and the other being capable of revolution relatively to the driven member, a pair of planetary gears of unequal diameter revoluble with the driving member and coöperating with the former gears for transmitting motion from the driving member to the driven member, means for preventing the rotation of said gear capable of revolution relatively to the driven member, and means for connecting to the driving member said gear capable of revolution relatively to the driven member and causing the same to rotate with the driving member, substantially as and for the purpose specified.

6. The combination of revoluble driven and driving members, a plurality of gears of unequal diameter, the gear of intermediate size being revoluble with the driven member and the small and large gears being capable of revolution relatively to the driven member, a plurality of gears of unequal diameter revoluble with the driving member and coöperating with the former gears for transmitting motion from the driving member to the driven member and rotating said driven member at different speed than the driving member and in reverse directions, means for preventing the rotation of said small and large gears, and means for connecting said small gear to the driving member and causing the same to rotate with the driving member, substantially as and for the purpose set forth.

7. The combination of revoluble driven and driving members having their axes substantially coincident, a plurality of spur-gears of unequal diameter, the spur-gear of intermediate size being revoluble with the driven member and the small and large spur-gears being capable of revolution relatively to the driven member, a plurality of spur-gears of unequal diameter fixed together and supported by the driving member eccentrically to its axis, said latter spur-gears being revoluble with the driving member and coöperating with the former spur-gears for transmitting motion from the driving member to the driven member and rotating said driven member in one direction at different speeds and also in the reverse direction, means for preventing the rotation of said small and large spur-gears, and means for connecting said small spur-gear to the driving member and causing the same to rotate with the driving member, substantially as and for the purpose described.

8. The combination of revoluble driven and driving members, the driving member being formed with an opening or chamber having peripheral and side walls, a pair of gears of unequal diameter, one being movable with the driven member and the other being capable of revolution relatively to the driven member, a pair of planetary gears of unequal diameter supported by the driving member in the opening or chamber thereof, said planetary gears being revoluble with the driving member and coöperating with the former gears for transmitting motion from the driving member to the driven member, and means for preventing the rotation of said gear capable of revolution relatively to the driven member, substantially as and for the purpose set forth.

9. The combination of a shaft, a driving member fixed to the shaft and provided with a hub, a driven member loosely mounted on the shaft and provided with a hub and a spur-gear fixed thereto, disks loosely mounted, respectively, on the hubs of the driving and driven members and having their opposing faces provided with spur-gears, one of said latter spur-gears being of less diameter than the first spur-gear and the other being of greater diameter than said first spur-gear, a plurality of spur-gears of unequal diameter fixed together and supported by the driving member eccentrically to its axis, said latter spur-gears being meshed with the former spur-gears, means for preventing the rotation of either of the gears provided on the disks, and means for connecting to the driving member one of the gears provided on said disks, substantially as and for the purpose specified.

10. The combination of revoluble driven and driving members, a plurality of gears of unequal diameter, one being revoluble with the driven member and the others being capable of revolution relatively to the driven member, means for preventing the rotation of said gears capable of revolution relatively to the driven member, and a plurality of planetary gears of unequal diameter revoluble with the driving member and coöperating with the former gears and said means for connecting the gear revoluble with the driven member to the driving member and to the gears capable of revolution relatively to the driven member and thereby transmitting different rotary motions from the driving member to said gear revoluble with the driven member, substantially as described.

11. The combination of revoluble driven and driving members, a plurality of gears of unequal diameter, one being revoluble with the driven member and the others being capable of revolution relatively to the driven member, a plurality of planetary gears of unequal diameter revoluble with the driving member and coöperating with the former gears for transmitting motion from the driving member to the driven member, means for preventing the rotation of said gears capable of revolution relatively to the driven member, and means for connecting to the driving member one of said gears capable of revolution relatively to the driven member and causing the same to rotate with the driving member, substantially as described.

12. The combination of revoluble driven and driving members, a plurality of gears of unequal diameter, one being revoluble with the driven member and the others being capable of revolution relatively to the driven member, means for preventing the rotation of said gears capable of revolution relatively to the driven member, a plurality of planetary gears of unequal diameter revoluble with the driving member and coöperating with the former gears and said means for connecting the gear revoluble with the driven member to the driving member and to the gears capable of revolution relatively to the driven member and thereby transmitting different rotary motions from the driving member to said gear revoluble with the driven member, and means for connecting to the driving member one of said gears capable of revolution relatively to the driven member and causing the same to rotate with the driving member, substantially as described.

13. The combination of revoluble driven and driving members, the driving member being formed with an opening or chamber having peripheral and side walls, a plurality of gears of unequal diameter, one being revoluble with the driven member and the others being capable of revolution relatively to the driven member, a plurality of planetary gears of unequal diameter supported by the driving member in the opening or chamber thereof, said planetary gears being revoluble with the driving member and coöperating with the former gears for transmitting motion from the driving member to the driven member, and means for preventing the rotation of said gears capable of revolution relatively to the driven member, substantially as and for the purpose described.

In testimony whereof I have hereunto signed my name, in the presence of two attesting witnesses, at Syracuse, in the county of Onondaga, in the State of New York, this 15th day of November, 1901.

ALEXANDER T. BROWN.

Witnesses:
  S. DAVIS,
  D. LAVINE.